United States Patent
Nyman et al.

(10) Patent No.: US 6,176,608 B1
(45) Date of Patent: Jan. 23, 2001

(54) METHOD AND APPARATUS FOR CONDUCTING THE TWO SOLUTIONS OF LIQUID-LIQUID EXTRACTION, MIXED INTO DISPERSION, IN A CONTROLLED FASHION INTO THE SEPARATION PART

(75) Inventors: Bror Nyman, Vanha-Ulvila; Launo Lilja; Stig-Erik Hultholm, both of Pori; Juhani Lyyra; Raimo Kuusisto, both of Espoo; Petri Taipale, Vantaa, all of (FI); Timo Saarenpää, Santiago (CL)

(73) Assignee: Outokumpu Technology Oy (FI)

( * ) Notice: Under 35 U.S.C. 154(b), the term of this patent shall be extended for 0 days.

(21) Appl. No.: 09/171,595

(22) PCT Filed: Apr. 29, 1997

(86) PCT No.: PCT/FI97/00254

§ 371 Date: Mar. 26, 1999

§ 102(e) Date: Mar. 26, 1999

(87) PCT Pub. No.: WO97/41938

PCT Pub. Date: Nov. 13, 1997

(30) Foreign Application Priority Data

May 7, 1996 (FI) .................................................... 961923

(51) Int. Cl.[7] ................................................... B01F 15/02
(52) U.S. Cl. ........................................ 366/150.1; 366/348
(58) Field of Search ................................... 366/136, 137, 366/150.1, 159.1, 167.1, 174.1, 182.1, 182.2, 348

(56) References Cited

U.S. PATENT DOCUMENTS

| | | | |
|---|---|---|---|
| 1,083,102 | * | 12/1913 | Jackson . |
| 1,843,157 | * | 2/1932 | Howe . |
| 2,342,559 | * | 2/1944 | Sebald et al. . |
| 2,365,293 | * | 12/1944 | Robinson . |
| 2,671,647 | * | 3/1954 | Wolpert . |
| 3,565,404 | * | 2/1971 | Reid et al. . |
| 4,534,655 | * | 8/1985 | King et al. . |
| 4,786,187 | * | 11/1988 | Nyman et al. . |
| 5,662,871 | | 9/1997 | Nyman et al. . |

* cited by examiner

Primary Examiner—Tony G. Soohoo
(74) Attorney, Agent, or Firm—Morgan & Finnegan, L.D.P.

(57) ABSTRACT

The method and apparatus according to the invention relate to conducting the dispersion of two phases, created in the mixing unit (1) of liquid—liquid extraction, from the mixing unit to the separation part (2), in which case the flow direction of the dispersion discharged from the mixing unit asymmetrically with respect to the separation part is turned to be symmetrical with respect to the separation part. In the last mixer (4) of the mixing unit, the orientation of the dispersion is turned to be parallel to the lengthwise axis of the separation part, by means of flow-turning members (9), the dispersion flow is discharged from the mixing unit at the height of the mixer bottom (10) and conducted to an uptake shaft (11) parallel to the lengthwise axis of the separation part, where the dispersion flow is turned upwards and made to be discharged symmetrically into the separation part.

12 Claims, 4 Drawing Sheets

Figure 1:
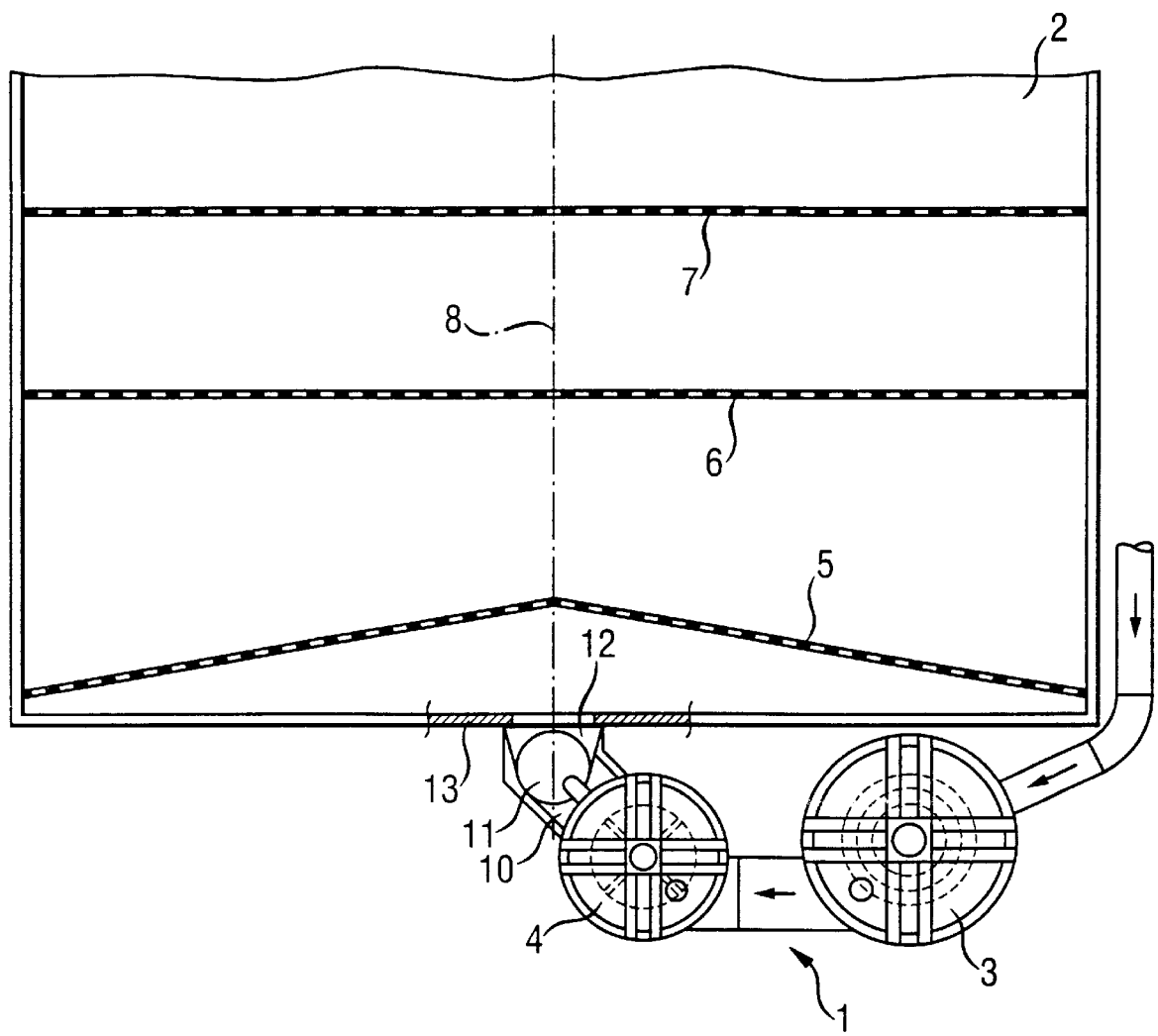

METHOD AND APPARATUS FOR CONDUCTING THE TWO SOLUTIONS OF LIQUID-LIQUID EXTRACTION, MIXED INTO DISPERSION, IN A CONTROLLED FASHION INTO THE SEPARATION PART

The present invention relates to a method for conducting the solutions of liquid—liquid extraction, which in the mixing unit are mixed into a dispersion, from the mixing unit further to the separation part. The invention also relates to an apparatus for realizing the method. The method how the dispersion is conducted into the separation part essentially affects the flow field of the whole separation part and its controllability. The object of the method and apparatus according to the invention is to enhance an intensified separation of the solutions by employing arrangements that align the dispersion flow in the sideways direction, attenuate and smooth it and make the horizontal and vertical feeding directions equally important as well as lower the counter-pressure directed to the dispersion feed from the side of the separation part.

The present invention also enables the construction of very large extraction plants, up to total flows of 5,000–6,000 m$^3$/h, whereas the maximum total flows processed with conventional technology are 3,000 m$^3$/h. As for the feeding arrangements in the separation part, it has been difficult to move over to larger flows, because along with larger total flow volumes, also the bottom of the mixing unit must always be constructed lower, and thus further from the separation part bottom level. This is due to the fact that the mixers are designed according to a given solution delay time, and the separation parts respectively according to a given separation capacity in relation to the surface area. In the case of large total flows, this means that the bottoms of the mixing units are 2–5 m lower than the bottom of the separation part.

According to the present invention, it is now possible to make use of the above described difference between the mixing and separation unit, by improving in the mixing unit the orientation of the dispersion formed of two separate solutions, when the dispersion is fed into the separation part, in order to separate into two different phases. The arrangement of the invention is compatible with the method and apparatus introduced in the FI patent application 93 5393. Thus the feeding arrangements described in said application and in the present application do not require that the mixing unit is divided into several serially connected spaces in order to keep their bottom levels near to each other or on the same level as the bottom level of the separation parts. In most cases in conventional extraction systems the dispersion is conducted into the separation part as surface flow, horizontally via the side of the mixing unit, so that it proceeds as a strong flow in the lengthwise direction of the separation part and enters the separation part. A strong surface flow occurring in the middle of the separation part hampers an even distribution of the dispersion over the whole transversal area of flow.

According to the FI patent application 93 5393, the removal of the mixing unit dispersion takes place along the height of the whole settler, in which case there is achieved the advantage that by directing the flow to be vertical, the dispersion can be conducted into the separation part as attenuated by gravitation. In the apparatus described in said FI application, the last mixer is arranged on the lengthwise axis of the settler, and the uptake shaft in between the mixer and the settler is a direct channel, so that it is located tangentially with respect to the mixing direction of the mixer, equals in size to the whole settler and has a width about half of the mixer diameter.

Particularly in extraction plants treating large solution flows, the length of the pipelines set demands on the placing of mixers. In order to keep the transfer distances of settled solutions as short as possible, it is advantageous that in each extraction step, the first device of the mixing unit, i.e. the pumping unit, is located in the corner of the mixing unit. On the other hand, the object is to achieve a compact mixing unit, where the transfer distances of the dispersion flowing from one device of the mixing unit to another should remain as short as possible and thus the phases would not have time to separate in the transfer pipework. It is naturally advantageous that the dispersion can, immediately when it flows out of the mixer, be turned, by means of an uptake shaft, to be parallel to the lengthwise axis of the separation part, but the placing of the last mixer on the center line of the separation part is not always possible due to the reasons described above; in that case the dispersion flow must be aligned and oriented towards the center line of the settler, although the location of the last mixer should deviate from the center line.

The present invention relates to a method and apparatus for conducting the dispersion from the mixing unit into the separation unit in conditions where a dispersion flow that is discharged from the mixing unit asymmetrically with respect to the lengthwise axis of the separation unit is turned and aligned to be symmetrical prior to feeding it into the separation unit. In order to turn the dispersion flow, the last mixer in the mixing unit is provided with flow-turning members. From the last mixer, the dispersion is first conducted along with a horizontal dispersion channel arranged on the same level as the bottom level of the mixer, to a dispersion uptake shaft connected to said channel and rising essentially vertically upwards. The uptake shaft is located on the lengthwise axis of the separation part, so that the dispersion channel leading from the mixer to the uptake shaft forms an angle with the lengthwise axis of the separation part, the size of said angle being 0–60°. According to the invention, the dispersion flow direction is thus turned to be symmetrical with the lengthwise axis of the separation part by means of flow baffles provided in the last mixer and by means of a flow-turning dispersion channel. Next, the dispersion is conducted to the front end of the separation part, from the uptake shaft opening along the whole width of the separation part, which uptake shaft also is advantageously expanding towards the separation part and has a bottom part that rises towards the separation part. According to another preferred embodiment, the uptake shaft is located underneath the front end of the separation part, and the dispersion is conducted to the bottom part of the separation part. The essential novel features of the invention are apparent from the appended patent claims.

Figure 2:
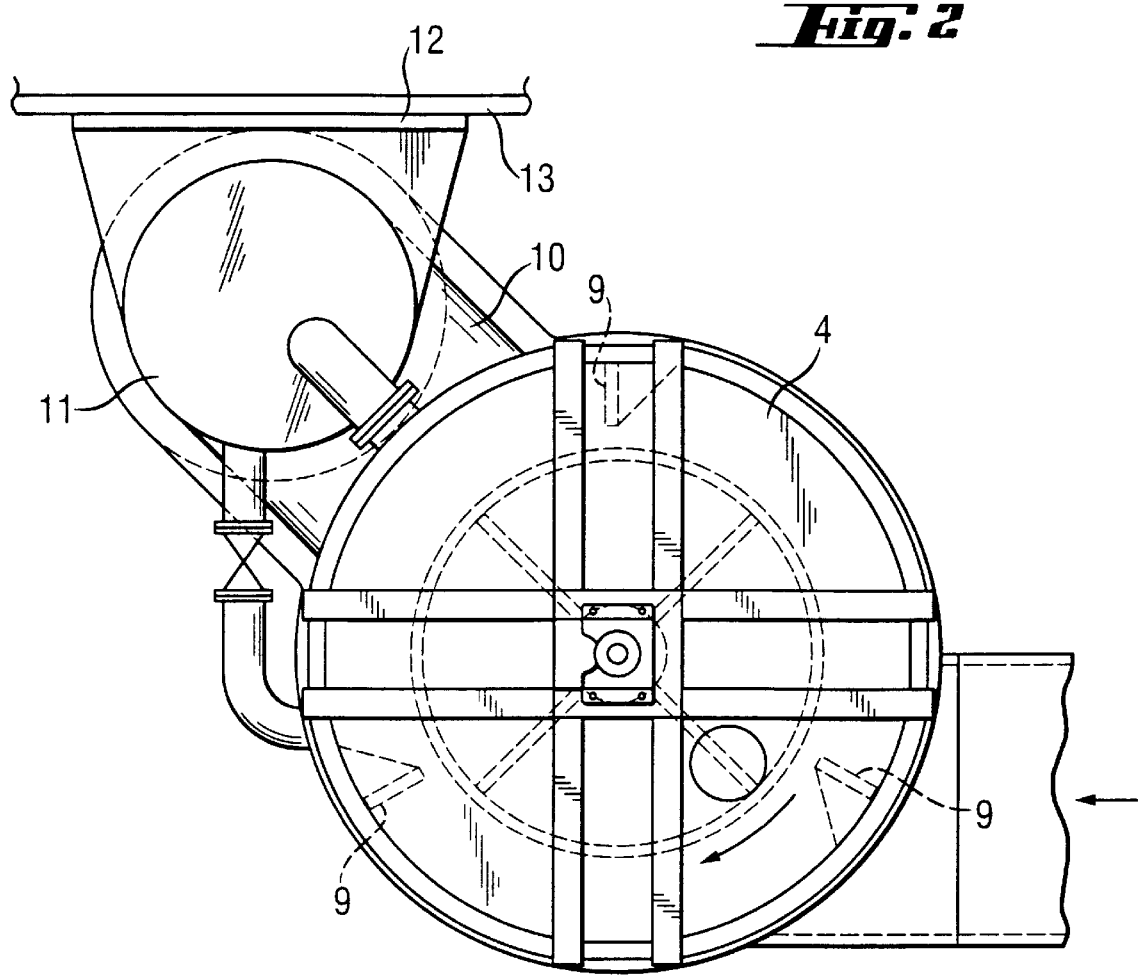
Figure 3:
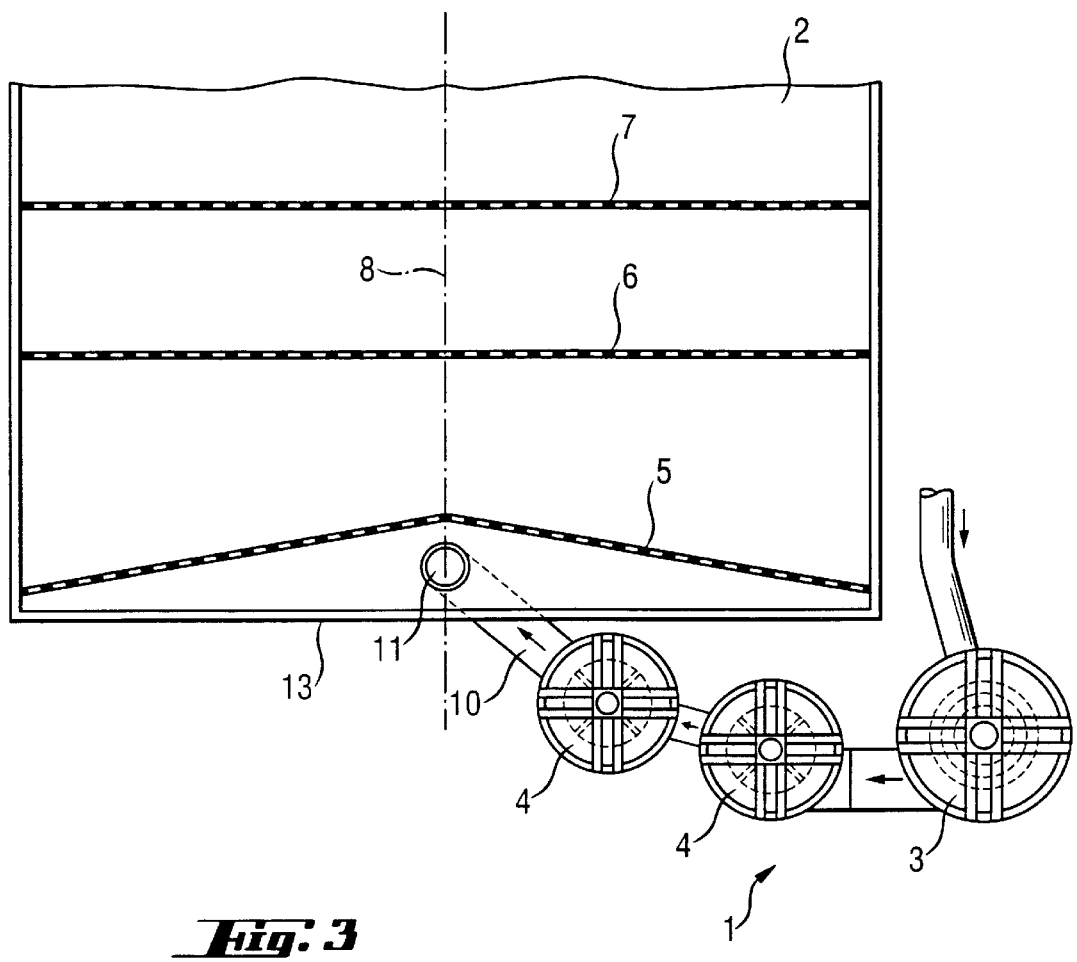
Figure 4:
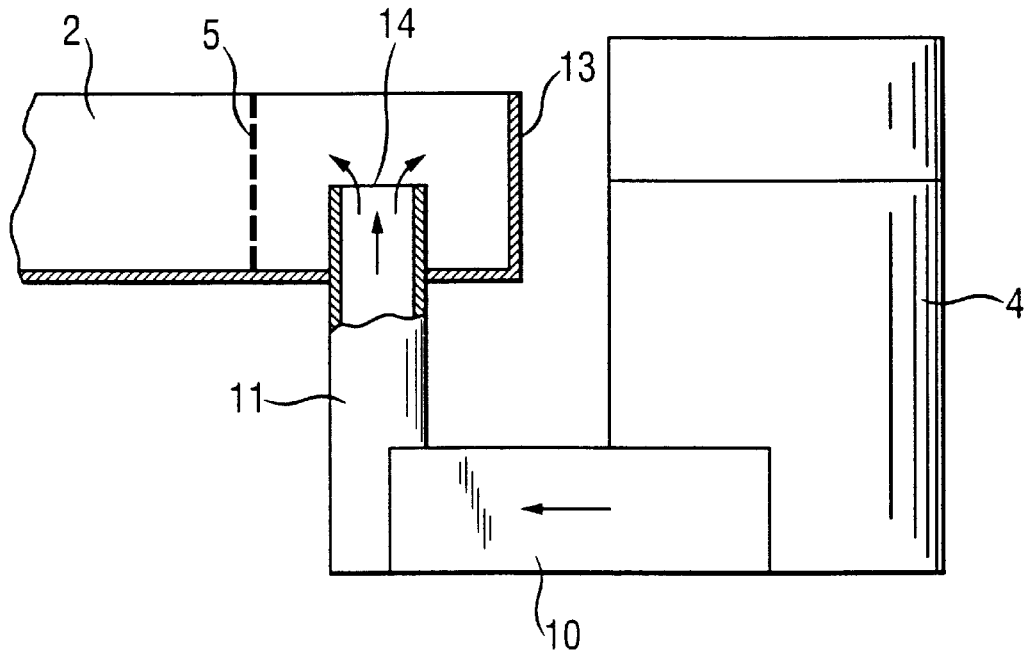
Figure 5:
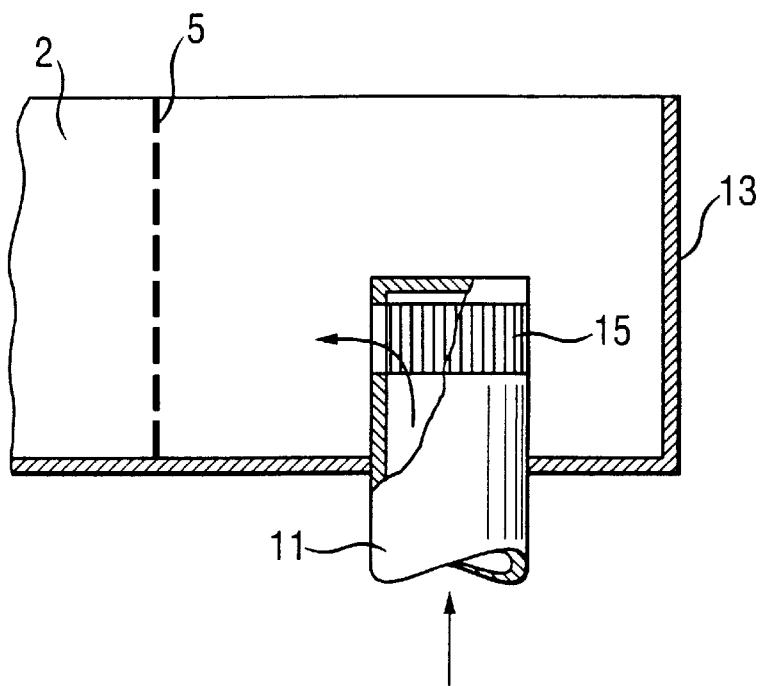

The invention is described in more detail with reference to the appended drawings, where FIG. 1 is a top-view illustration of the mixing unit and the front end of the separation part, FIG. 2 is a more detailed top-view illustration of the dispersion feeding arrangement, FIG. 3 is a schematical top-view illustration of a preferred embodiment of the invention, FIG. 4 is a side-view illustration of the embodiment of FIG. 3, and FIG. 5 shows a detail of FIG. 4.

FIG. 1 represents an extraction step comprising a mixing unit 1 and a separation part, i.e. a settler 2. The mixing unit in part includes, in this case, a pumping unit 3 and one mixer 4, as well as the necessary solution and dispersion transfer pipes, which are not described in more detail. It is naturally clear that the number of mixers may vary. In the settler 2, which is only illustrated at its front end, there are installed several picket fences 5, 6 and 7 in order to evenly distribute the dispersion over the whole transversal area of the settler.

As is seen in FIGS. 1 and 2, the mixer 4 is not located on the lengthwise axis 8 parallel to the flow direction of the settler 2, wherefore the dispersion must be realigned prior to feeding it to the settler. In order to be able to flexibly change the flow direction of the dispersion from the direction of rotation of the mixer to the lengthwise direction of the settler, the mixer is provided with vertical flow baffles 9, which turn the dispersion into the desired direction. Particularly when seen in the direction of rotation, the flow baffle immediately after the aperture leading to the dispersion channel 10 is important.

From the last mixer 4 of the mixing unit, the dispersion is transferred further by means of a dispersion channel 10 forming an angle with the mixer. The channel forms an angle of 0–60° with the lengthwise axis of the settler, depending on the location of the mixer. By means of the flow baffles 9 and the dispersion channel 10, the direction of the dispersion flow can be turned so that for instance in the case of FIGS. 1 and 2, where it could be assumed that the dispersion flow in the settler turns powerfully to the side, in this case to the left, it can be directly aligned to be parallel to the settler lengthwise axis.

From the dispersion channel 10, the dispersion further rises in the vertical direction, and via a cylindrical uptake shaft 11 located on the settler lengthwise axis to the settler 2. The settler-side edge of the uptake-shaft, i.e. its front edge 12, opens to the front part 13 of the settler and expands further towards the settler. The front edge of the uptake shaft rises towards the settler at an angle of 0–60°, advantageously 25–35°, with respect to the horizontal level.

The dispersion channel and the uptake shaft are designed so that the dispersion flow speed is of the order 0.2–0.7 m/s. In order to eliminate the counterpressure caused in the dispersion by the heavier aqueous solution separated in the settler, the settler-side edge of the uptake shaft must be raised higher than the settler bottom level, so that the dispersion flow must flow over a small threshold. Otherwise the dispersion flows into the settler over the whole height thereof. The height of the threshold is 0.15–0.5 times the liquid height of the separation part.

FIG. 3 shows an illustration of the principles of another arrangement according to the invention, where the uptake shaft is located underneath the inlet end 13 of the settler. The arrangement of FIG. 3, where the vertical uptake shaft is located on the center line 8 of the settler at the front end thereof facilitates the division of the dispersion into the settler as a wide, even front. The input flow can be stopped by means of gravity now that the solutions enter the separation part from underneath it.

FIG. 4 shows a threshold 14, over which the dispersion flows into the settler. FIG. 5 illustrates how the threshold can be further provided with apertures 15 in order to achieve an even distribution of the dispersion. By means of the number and size of the apertures provided in the cylindrical threshold, a maximally even distribution of the dispersion can be further enhanced, but the distribution must be compatible with the operation of the picket fences.

In addition to the advantages described above, the arrangement according to the invention also brings about the advantage that by employing said method and apparatus, it is easier in a transfer situation to maintain a dispersion where the aqueous solution is present as drops in an organic solution, which is a continuous solution.

What is claimed is:

1. A method for conducting a dispersion of two phases created in a mixing unit of liquid—liquid extraction symmetrically from the mixing unit to a separation part, characterized in that the last mixer of the mixing unit is placed asymmetrically with respect to the lengthwise axis of the separation part, in which case the direction of the dispersion is aligned to be parallel to the lengthwise axis of the separation part by means of flow-turning members in the last mixer and a dispersion channel arranged on the height of the mixer bottom to which dispersion channel the dispersion is discharged from the mixing unit, whereafter the dispersion is conducted from the channel to an uptake shaft located on the lengthwise axis of the separation part, in which shaft the dispersion flow is turned upwards and made to be symmetrically discharged into the separation part.

2. A method according to claim 1, characterized in that the bottom edge of the dispersion flow discharged into the separation part is located, in relation to the bottom of the separation part, at a height which is 0.15–0.5 times the height of the liquid surface of the separation part.

3. A method according to claim 1, characterized in that the dispersion channel forms an angle of 0–60° with the lengthwise axis of the separation part.

4. A method according to claim 1, characterized in that the dispersion flow is discharged into the inlet end of the separation part.

5. A method according to claim 1, characterized in that the dispersion flow is discharged into the separation part from underneath its inlet end.

6. An apparatus for conducting the dispersion of two phases created in mixing unit (1) of liquid—liquid extraction symmetrically from the last mixer (4) of a mixing unit to a settler (2), characterized in that the last mixer (4) of the mixing unit (1), which is located asymmetrically with respect to the lengthwise axis (8) of the settler, is provided with flow baffles (9), and that the mixer (4) is at the bottom part connected essentially horizontally to the dispersion channel (9), which forms an angle of 0–60° with the lengthwise axis of the settler, said dispersion channel (9) being at the other end connected to an essentially vertical dispersion uptake shaft (10), which opens towards the settler (2).

7. An apparatus according to claim 6, characterized in that the dispersion uptake shaft (11) is provided with a threshold (14) rising up from the bottom part of the settler, the height of said threshold being 0.15–0.5 times the height of the liquid surface in the settler.

8. An apparatus according to claim 6, characterized in that the front edge (12) of the dispersion uptake shaft opens towards the inlet end (13) of the settler.

9. An apparatus according to claim 8, characterized in that the front edge (12) of the uptake shaft expands towards the settler (2).

10. An apparatus according to claim 8, characterized in that the front edge (12) of the settler expands 0–60° with respect to the horizontal level towards the inlet end (13) of the settler.

11. An apparatus according to claim 6, characterized in that the uptake shaft (11) opens towards the bottom of the settler inlet end (13).

12. An apparatus according to claim 11, characterized in that a threshold (14) of the uptake shaft is provided with slots (15).

* * * * *